(12) United States Patent
Armstrong et al.

(10) Patent No.: US 8,751,871 B2
(45) Date of Patent: Jun. 10, 2014

(54) METHOD FOR MODIFYING A USER INTERFACE

(75) Inventors: Andrew Alan Armstrong, Romsey (GB); Jonathan Christopher Mace, Providence, RI (US); Richard William Pilot, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 362 days.

(21) Appl. No.: 13/313,338

(22) Filed: Dec. 7, 2011

(65) Prior Publication Data

US 2012/0151279 A1 Jun. 14, 2012

(30) Foreign Application Priority Data

Dec. 9, 2010 (EP) .................................... 10194403

(51) Int. Cl.
*G06F 11/00* (2006.01)
(52) U.S. Cl.
USPC .......................................................... 714/37
(58) Field of Classification Search
CPC .. G06F 11/07; G06F 11/0703; G06F 11/0793
USPC ................................................. 714/37, 38.1
See application file for complete search history.

(56) References Cited

U.S. PATENT DOCUMENTS

| | | | | |
|---|---|---|---|---|
| 7,849,364 B2* | 12/2010 | Callender | .................... | 714/38.1 |
| 8,332,765 B2* | 12/2012 | Ergan et al. | ................... | 715/764 |
| 2003/0191987 A1* | 10/2003 | Brown | ........................... | 714/38 |
| 2009/0113248 A1* | 4/2009 | Bock et al. | ...................... | 714/39 |
| 2010/0229112 A1* | 9/2010 | Ergan et al. | ................... | 715/764 |

OTHER PUBLICATIONS

Nauerz, A. et al. "Using Collective Intelligence for Adaptive Navigation in Web Portals" ICWE 2008 Workshops, 3rd Int. Workshop on Adaptation and Evolution in Web Systems Engineering—AEWSE 2008, pp. 89-94.

"Collective Adaptive Systems" Expert Consultation Workshop, Nov. 3-4, 2009; Future and Emerging Technologies Proactive; European Commission-Information Society and Media.

Barra, M. et al. "GAS: Group Adaptive System" Adaptive Hypermedia and Adaptive Web-Based Systems, Second International Confernce, AH 2002 Malaga, Spain LNCS 2347, pp. 47-57 2002.

* cited by examiner

*Primary Examiner* — Bryce Bonzo
(74) *Attorney, Agent, or Firm* — Grasso PLLC; Fred Grasso (57) ABSTRACT

A method for modifying a user interface (UI), comprising the steps of: listening for a UI event; determining whether the UI event is erroneous; in response to determining that the UI event is erroneous, initiating a recording comprising a user fix of the error and a state associated with the UI; storing the user fix as an alternative UI event; and in response to subsequently detecting the UI event and a matching state associated with the UI, providing the alternative UI event such that the UI is modified.

20 Claims, 8 Drawing Sheets

FIG. 1

[Prior Art]

METHOD FOR MODIFYING A USER INTERFACE

FIELD OF THE INVENTION

The present invention provides a method for modifying a user interface.

BACKGROUND

Unintuitive user interfaces (UI) or poor system design can mean that certain errors are more likely to occur than others. Most modern software solutions provide a user with visual feedback (e.g., error messages; warning dialog boxes; highlighting of problem areas) when erroneous user input is provided.

Figure 1:
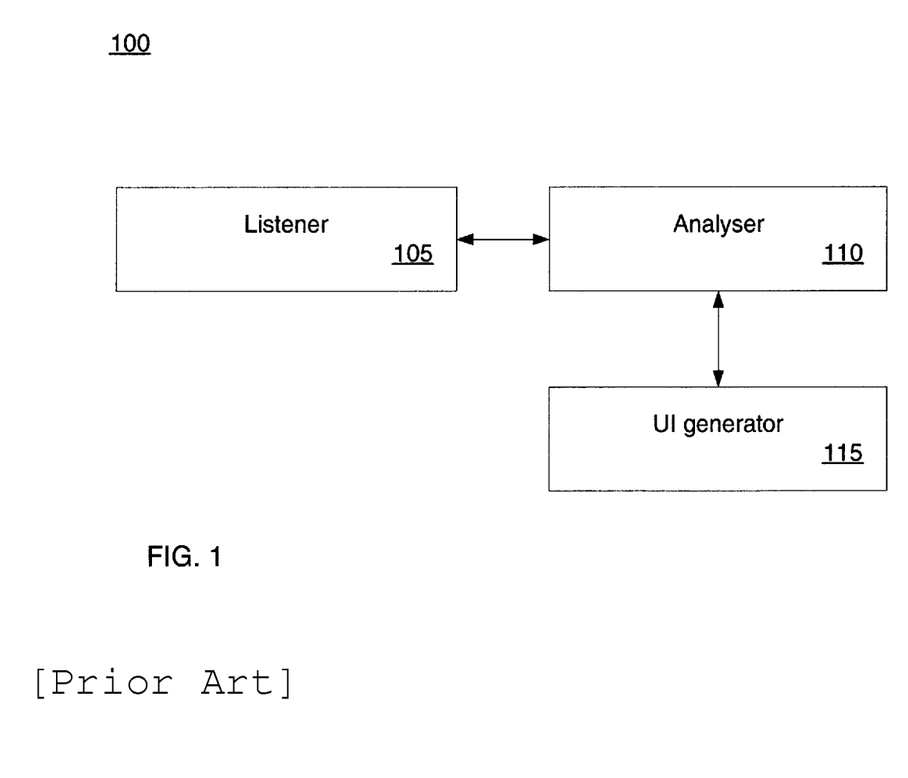
FIG. 1 is a block diagram of a prior art system that handles UI events.

For example, with reference to the system (100) shown in FIG. 1, a listener (105) listens for UI events and passes one or more UI events to an analyser (110). If the analyser (110) detects that a UI event is erroneous, it alerts a UI generator (115) which modifies the UI to inform the user of the erroneous event (e.g., by displaying a dialog box).

The aim of such a solution is to provide a feedback mechanism for the user so that the user can attempt to correct the error and continue. However, the onus is on the user to learn from their error such that he/she does not encounter the same error again.

A problem associated with such a solution is that it does not take into account how or why the error occurred in the first instance.

Typically, a user has to provide information regarding the error to developers of the UI (e.g., using a forum, form etc.). Subsequently, the developer has to manually trawl through the information provided; analyse the error; determine an appropriate fix; implement the fix and release the fix—this process is burdensome in terms of time and overhead and results in a slow process of taking into consideration user-provided information.

In another solution, information can be suggested based on user errors such as misclicks. For example, in its search engine, Google® provides alternative suggestions of search queries in response to common errors in the input of a search query.

DETAILED DISCLOSURE

By allowing the user interface to change based on encountered errors, the amount of time the user is spending in fixing frequently occurring problems can be reduced, leading to work being completed more efficiently.

Preferred embodiments can advantageously promote that the corrective data is as suitable as possible.

Preferred embodiments can identify areas in a UI that consistently require a user's attention. Here, details of alternative UI events used by a user can be fed back to developers of the UI, and in so doing the developers are provided with fine-grained information.

Embodiments can include methods for modifying a user interface (UI), where the methods comprise some or all of the following steps: listening for a UI event; determining whether the UI event is erroneous; in response to determining that the UI event is erroneous, initiating a recording comprising a user fix of the error and a state associated with the UI; storing the user fix as an alternative UI event; and in response to subsequently detecting the UI event and a matching state associated with the UI, providing the alternative UI event such that the UI is modified. In this embodiment as well as in others, modifications to the steps themselves may be made, the order in which they are carried out may vary, and fewer or additional steps may be undertaken as well.

Embodiments can also include an apparatus for modifying a user interface (UI), the apparatus comprising some or all of the following: a listener for listening for a UI event; a determiner for determining whether the UI event is erroneous; a UI recorder, responsive to determining that the UI event is erroneous, for initiating a recording comprising a user fix of the error and a state associated with the UI; means for storing the user fix as an alternative UI event; and means, responsive to subsequently detecting the UI event and a matching state associated with the UI, for providing the alternative UI event such that the UI is modified.

Embodiments can further include a computer program comprising computer program code stored on a computer readable medium, the code, when loaded into a computer system and executed thereon causing the computer system to perform some or all of the steps of the method described above.

BRIEF DESCRIPTION OF THE DRAWINGS

The present invention will now be described, by way of example only, with reference to preferred embodiments thereof, as illustrated in the following drawings.

DETAILED DESCRIPTION

Figure 2:
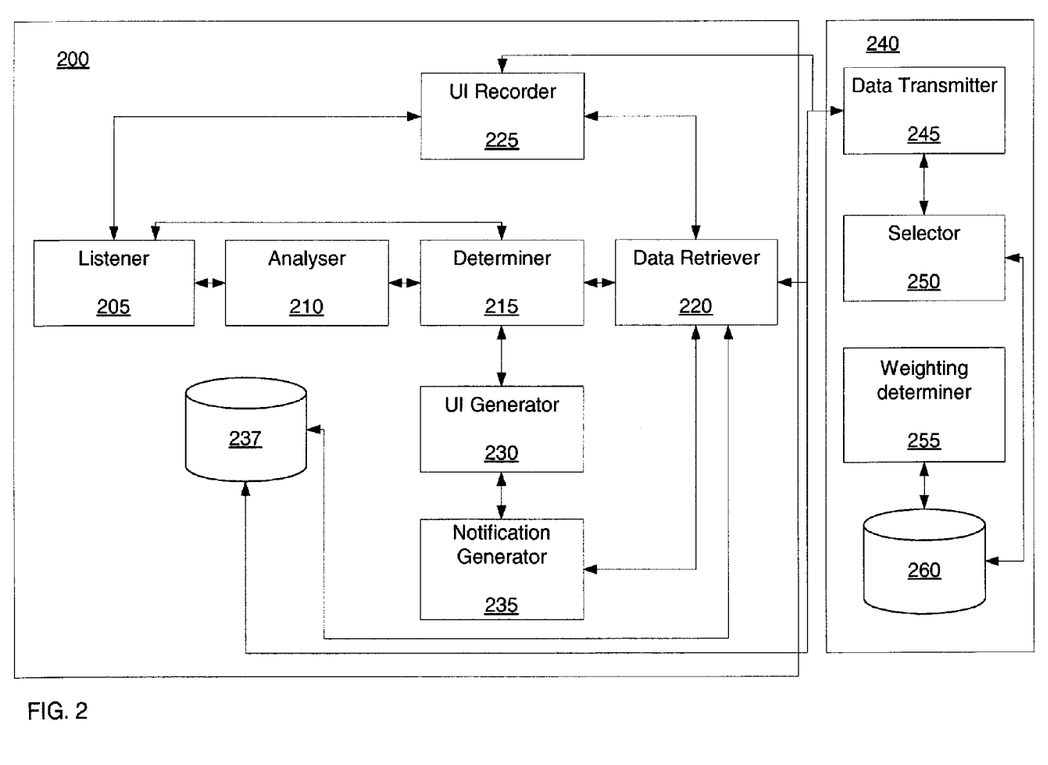
FIG. 2 is a block diagram of a system that handles UI events according to the preferred embodiment.

A system according to preferred embodiments is shown in FIG. 2. This system is shown in FIG. 2 as comprising a local data processing system (200) and a remote data processing system (240). The local data processing system (200) comprises a listener (205); an analyser (210); a determiner (215); a data retriever (220); a UI recorder (225); a UI generator (230); a notification generator (235) and a local storage component (237). The data retriever (220) and the UI recorder (225) are operable to communicate with a data transmitter (245) of the remote data processing system (240). The remote data processing system (240) also comprises a selector (250); a weighting determiner (255); and a remote storage component (260).

Figure 3:
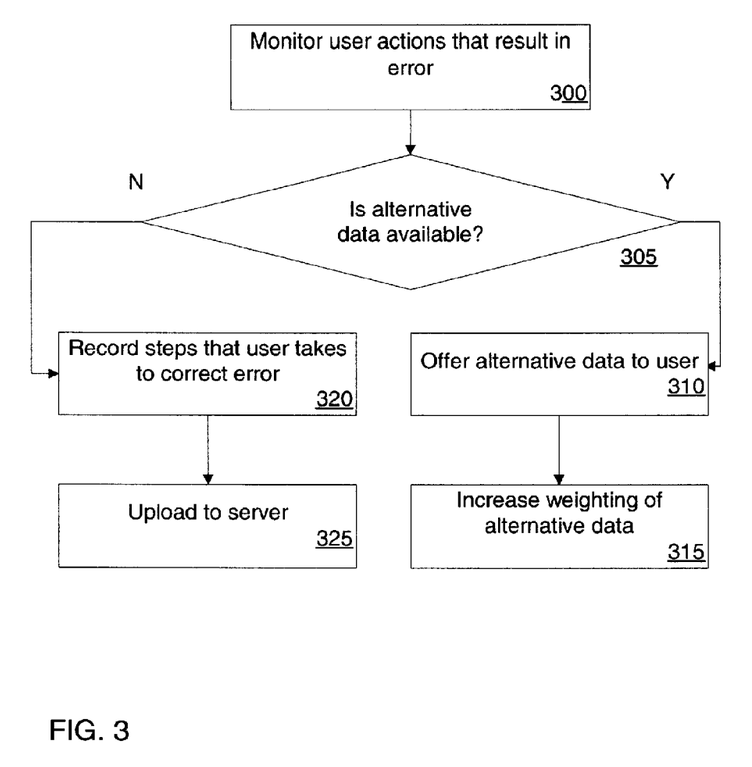
FIG. 3 is a flow chart showing the operational steps involved in a process for handling erroneous user input according to preferred embodiments.

Processes of preferred embodiment are shown in the figures and described herein, these processes may include other steps, fewer steps, be performed in various order and may have modifications to the steps themselves. With reference to FIG. 3, there is shown a flow chart showing the operational steps involved in a process for handling erroneous user input. At step 300, the listener (205) registers itself with the local data processing system (200) in order to listen for UI events that occur in the system (200) (e.g., a dialog box being generated or closed; an error message being generated). In this process, the listener (205) may identify a state of the UI, e.g., the type of UI component that is currently being interacted with which is determined using known operating system window control focus functions. The listener (205) may also, alternatively, use the detection of known events such as "Selection Changed" and "Data Changed" if the events are generated in the local data processing system (200) to identify the state of the UI. In response to a UI event (e.g., input to a form comprising "app__1"), the listener (205) may pass the UI event to the analyser (210) and the UI event and type of UI component that is currently being interacted with to the data retriever (220). And, in response to receiving the UI event, the analyser (210) can determine a return code associated with the UI event. The analyser (210) may then pass results (e.g., the UI event and the return code) associated with the analysis to the determiner (215).

In response to receiving the analysis results, the determiner (215) may determine whether the UI event is erroneous. For example, if the return code is associated with an error code, the determiner (215) may be configured to conclude that the UI event is erroneous and if the return code is not associated with an error code, the determiner (215) is configured to conclude that the UI event is not erroneous. If the UI event is not erroneous, processing can return to the listener (205) which listens for more UI events. In the example of FIG. 3, the return code is associated with an error code and the determiner (215) determines that the UI event is erroneous.

With reference to step 305, the determiner passes the determination (e.g., that the UI event is erroneous) to the data retriever (220) which determines whether an alternative UI event is available. More specifically, the data retriever (220) establishes communication with the data transmitter (245) of the remote data processing system (240), passing the erroneous UI event and the type of UI component that is currently being interacted with. The data transmitter (245) invokes the selector (250) again passing the erroneous UI event and the type of UI component. The selector (250) accesses the remote storage component (260), which comprises one or more alternative UI events and associated weights—preferably, the one or more alternative UI events that are also associated with the type of UI component—examples are shown below:

Type of UI component: Application Dialog Box
user1/application__1/v6: weight=+10
user2/application__1/11:20: weight=+5
user2/app__2/v7: weight=+2

The selector (250) compares the erroneous UI event "app__1" against the one or more alternative UI events to select an alternative UI event. Preferably, the selector (250) parses the alternative UI event and matches the string "app__1" in order to determine a closest matching alternative UI event—in the example, the selector (250) determines that the following alternative UI events are the closest matching:

user1/application__1/v6: weight=+10
user2/application__1/11:20: weight=+5

The selector (250) analyses the weights associated with the closest matching alternative UI events in order to select an alternative UI event—in the example, the selector (250) selects the alternative UI event with the relatively higher weight, namely "user1/application__1/v6". The selector (250) passes the alternative UI event to the data transmitter (245) which in turn passes the alternative UI event to the data retriever (220). In the example, as there is an alternative UI event available (positive result to step 305), the notification generator (235) provides (step 310) the alternative UI event to the user by invoking the UI generator (230) which displays the alternative UI event.

At step 315, as an alternative UI event has been provided to the local data processing system (200), the weighting determiner (255) increases (e.g., by a pre-configured value) the weight of the alternative UI event by writing to the remote storage component (260). Note that the weights can be assigned manually by a systems administrator or can be generated automatically (e.g., by the weighting determiner (255)) based on one or more parameters such as how frequently an alternative UI event has been provided to the local data processing system (200). Advantageously, the weights allow the preferred embodiment to adapt to user errors by learning which mistakes occur more frequently.

At step 305, if an alternative UI event is not available (e.g., a negative result to step 305), the data retriever (220) invokes the UI recorder (225) which begins a recording (step 320) of one or more subsequent UI events input by the user (e.g., in order to record a fix undertaken by the user). In an example, a user may alter the input "app__1" with the string "user1/application__1/v6" and this subsequent UI event may be recorded. Preferably, the UI recorder (225) also records a state of the UI, for example, a type of UI component that is currently being interacted with.

In response to the recording, the UI recorder (225) may transmit the one or more subsequent UI events and the type of UI component that is currently being interacted with to the data transmitter (245). The data transmitter (245) passes the one or more subsequent UI events and the type of UI component that is currently being interacted with to the selector (250), which stores (step 325) the one or more subsequent UI events as alternative UI events in the remote storage component (260), associating the one or more subsequent UI events with the type of UI component that is currently being interacted with. Preferably, the one or more subsequent UI events are initially analysed by a systems administrator prior to storage in the remote storage component (260) in order to more accurately determine the UI events which represent a successful fix. Preferably, fixes from several remote users can be stored in the remote storage component (260) thereby creating a knowledge base of data gathered in light of errors inputted by past users.

Another process of the preferred embodiment will now be described with reference to FIG. 4, which is a flow chart showing the operational steps involved in a process for modifying a UI according to the preferred embodiment. Preferably, the process makes use of data that has been gathered in light of previous user errors (e.g., using the process of FIG. 3). At step 400, the user interacts with a UI component—an example of a UI component (500) (e.g., an "Application Dialog Box") is depicted in FIG. 5A. The UI component (500) comprises a number of subcomponents (505, 510, 515 and 520) which are configured to accept user input.

Figure 4:
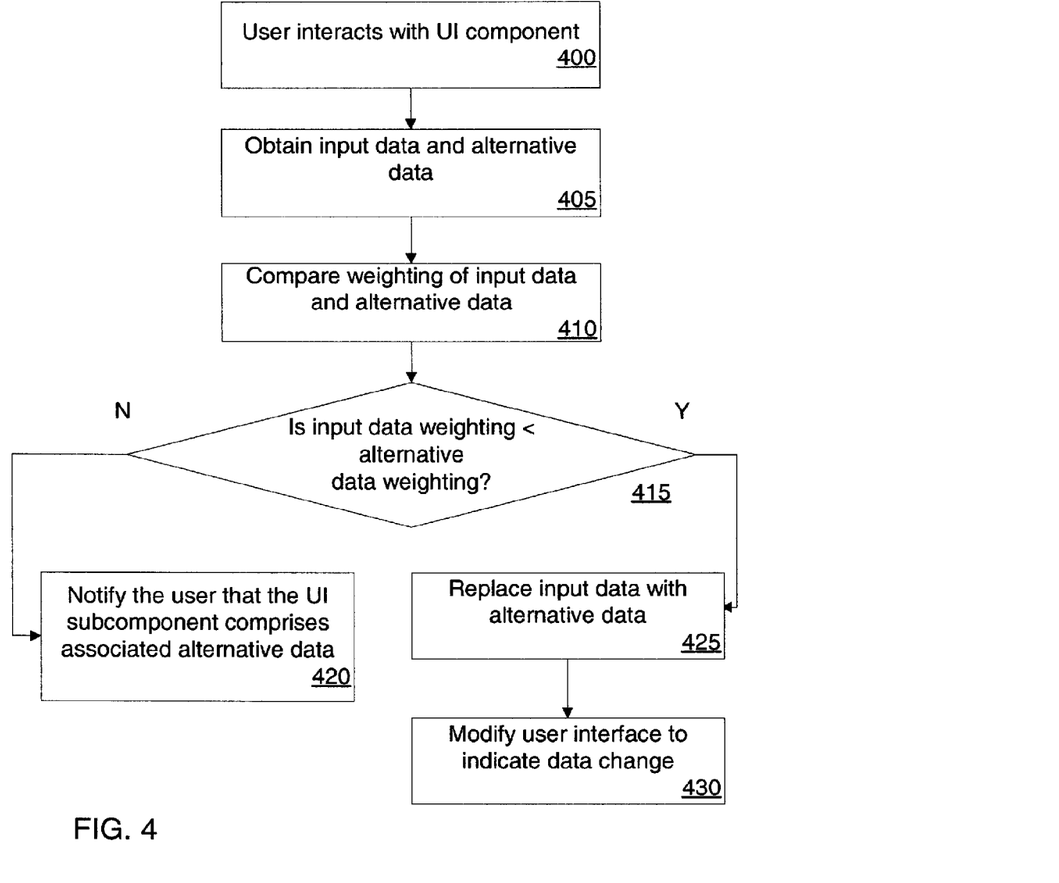
FIG. 4 is a flow chart showing the operational steps involved in a process for modifying a UI according to preferred embodiments.
Figure 5A:
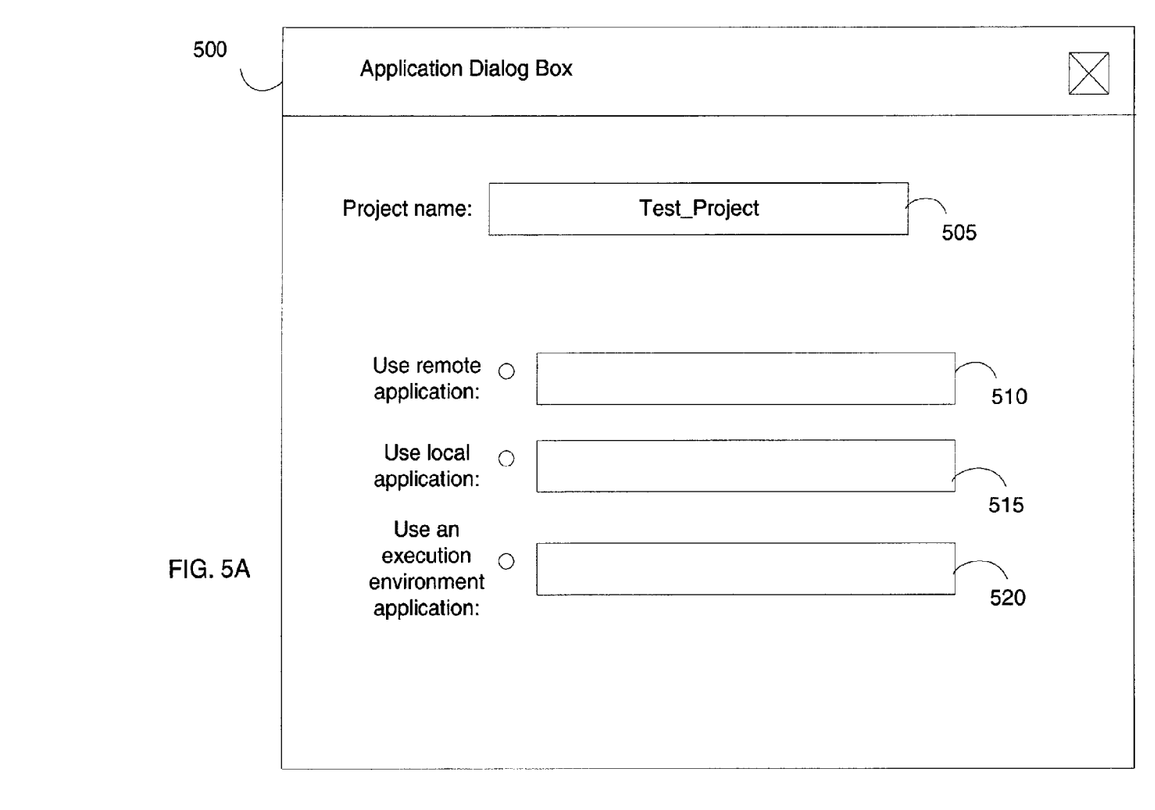
FIGS. 5A-5D depict block diagram representations of a UI according to preferred embodiments.
Figure 5B:
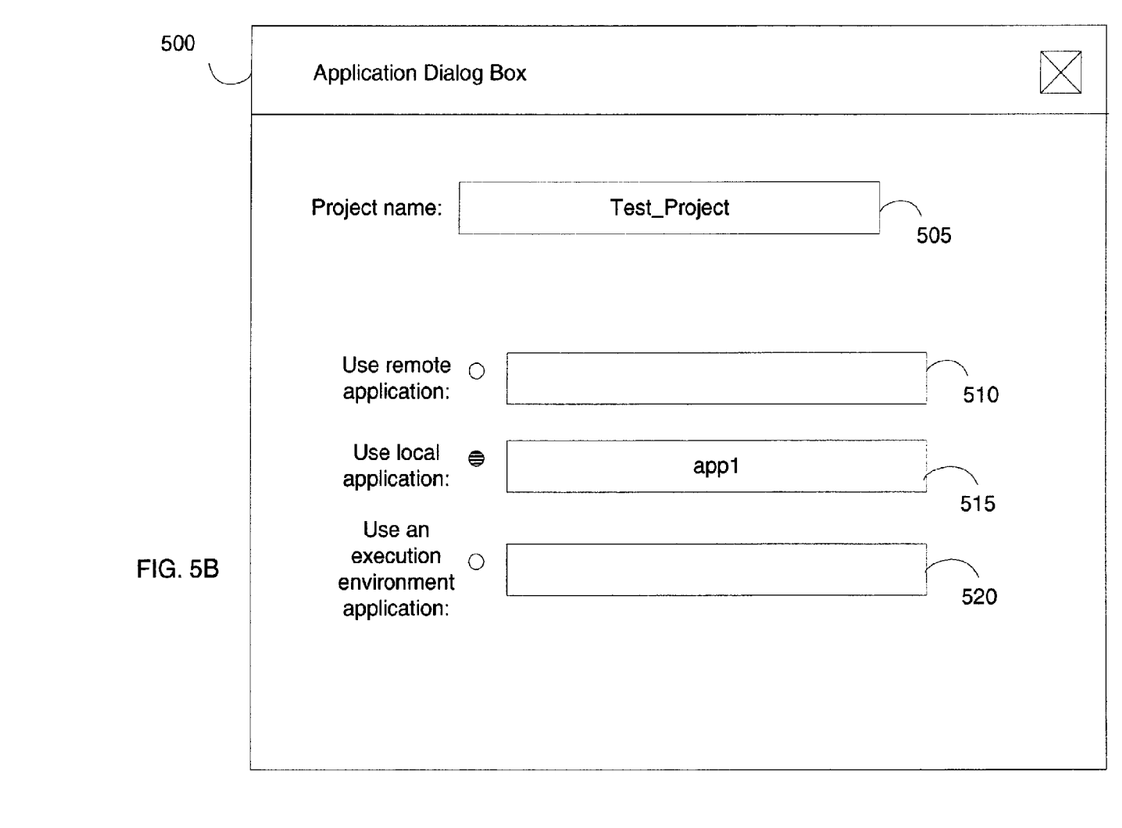

In FIG. 4 the user interacts with subcomponent 515 by performing one or more UI events—the type of UI component being interacted with and the subcomponent being interacted with is determined (e.g., using known operating system window control focus functions or known events). The UI event comprises clicking a radio button and inputting an associated text string, "app__1" as shown in FIG. 5B.

Here and in other embodiments, preferably, each UI event that is input is weighted (e.g., initially based on a pre-configurable value). Details of a UI event and its weight may be stored in the local storage component (237)—an example is shown below:

Type of UI component: Application Dialog Box
click radio button; "app__1": weight=+7

At step 405, the listener (205) obtains the UI event (e.g., the clicking of the radio button and the input of text string, "app__1") and passes the UI event to the determiner (215). Further, at step 405, the data retriever (220) establishes communication with the data transmitter (245) of the remote data processing system (240) in order to retrieve an alternative UI event as described above with reference to FIG. 3, by means of the selector (250) which uses the erroneous UI event and the type of UI component to select an alternative UI event—note that advantageously, the selector (250) is able to query a collection of alternative UI events that has been determined and weighted e.g., using data gathered in light of errors inputted by past users.

Figure 5C:
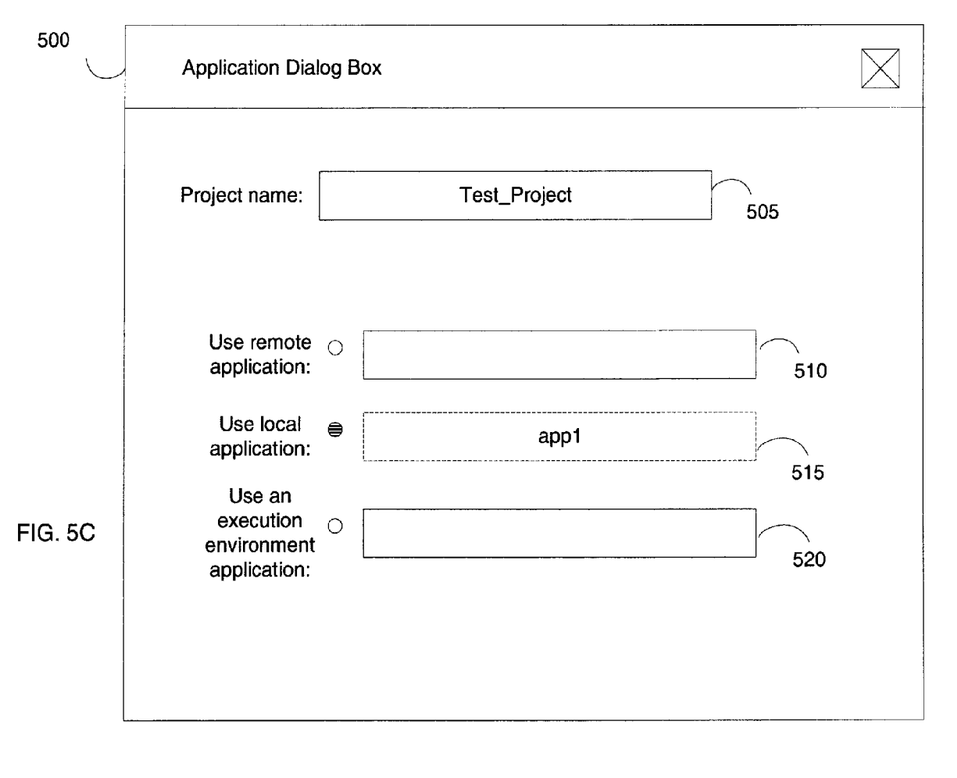

In the example, the alternative UI event comprises: "user1/application_1/v6" and has an associated weight of +10. The alternative UI event is passed to the data retriever (220). In response to receiving the alternative UI event, the data retriever (220) passes the alternative UI event to the determiner (215). At step 410, the determiner (215) compares the weight associated with the UI event with the weight associated with the alternative UI event in order to determine (step 415) whether the weight associated with the UI event is less than the weight associated with the alternative UI event. In response to the weight associated with the UI event not being less than the weight associated with the alternative UI event, the UI generator (230) may be invoked by the determiner (215) to modify (step 420) the UI such that the user can be notified that an alternative UI event associated with the subcomponent being interacted with is available. In an example, the subcomponent being interacted with is modified e.g., as shown in FIG. 5C, wherein the subcomponent is made more prominent by the display of dashes surrounding the border of the subcomponent, resulting in a modification of the UI. Advantageously, this provides the user with a strong hint as to which subcomponent of the UI is associated with the error without removing the erroneous input data.

Figure 5D:
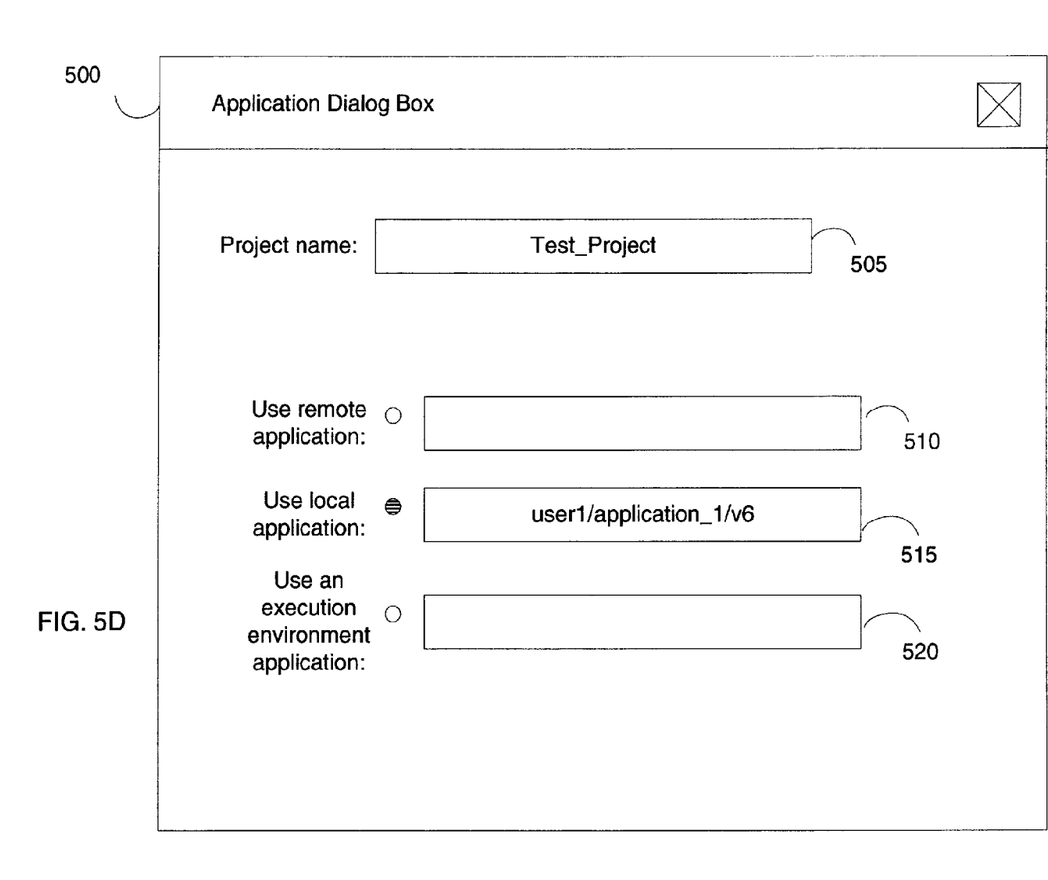

In response to the weight associated with the UI event being less than the weight associated with the alternative UI event, the UI generator (230) may be invoked by the determiner (215) to replace (step 425) the UI event with the alternative UI event. Further, the UI may be modified (step 430) to reflect the replacement. In the example, the replacement of "app_1" with "user1/application_1/v6" and modification of the UI are shown in FIG. 5D. Preferably, the listener (205) continues to listen for UI events e.g., in order to determine whether the user has replaced the alternative UI event with the original UI event. In this scenario, preferably, such result is fed back to the remote data processing system (240) such that the weighting determiner (255) can modify (e.g., decrease) the weight of the alternative UI event.

Various implementations and modifications are encompassed by the embodiments. In preferred embodiments details associated with e.g., erroneous UI events are fed back to developers of the UI such that the developers are able to identify commonly encountered errors and determine e.g., how the UI can be changed to make it more intuitive. Also, it can be preferable to for the weightings to be used to provide a degree of flexibility in modifications to the UI. For example, assigning a relatively high weight to an input UI event would aid in preventing the replacement of the input UI event with an alternative UI event. This can be useful in certain scenarios e.g., if the user was entering information in a form that was associated with a specific purpose, a first instance of an error made by the user may also be very specific and may not necessarily be repeated frequently—thus, it may not make sense in this scenario to modify the UI after a first instance of an error. By using weightings, a UI can be able to change in a more flexible manner such that e.g., common errors are acted upon but first instance/one-time errors are not. Still further, in certain instances, if modification of a UI is required in light of any error (including first instance/one-time errors), a relatively low weight (e.g., zero) can be assigned to an input UI event.

In embodiments, it is preferable that UI events (e.g., input associated with a field) that vary greatly or change frequently, be assigned a relatively low weight—this accounts for the scenario whereby UI events that vary or change frequently are more likely to be input incorrectly. Thus, a more suitable alternative UI event is more likely to be needed. Also, in embodiments, a user may be able to override the weighting feature by specifying that he/she always requires an alternative UI event to replace a UI event.

Still further, in preferred embodiments, data can be collated and gathered from a set of user errors and the data may be used to dynamically change the layout, organization and presentation of a UI. For example, the layout and organization of UI components can be altered on the display screen (e.g., a UI component can be minimised or can be brought to the forefront); alternative UI components (such as menus; dialog boxes) can be presented as well. Feedback may also be derived from the errors of one or several users of a UI to be exploited such that once a user error has been inputted and an alternative UI event has been derived, subsequent users of the UI can benefit. Over time, preferred embodiments can collect data associated with fixes that user have made and will be able to weight these fixes such that the most appropriate alternative UI events can be provided.

It will be clear to one of ordinary skill in the art that all or part of the method of the preferred embodiments of the present invention may suitably and usefully be embodied in a logic apparatus, or a plurality of logic apparatus, comprising logic elements arranged to perform the steps of the method and that such logic elements may comprise hardware components, firmware components or a combination thereof.

It will be equally clear to one of skill in the art that all or part of a logic arrangement according to the preferred embodiments of the present invention may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed storage media.

It will be appreciated that the method and arrangement described above may also suitably be carried out fully or partially in software running on one or more processors (not shown in the Figures), and that the software may be provided in the form of one or more computer program elements carried on any suitable data-carrier (also not shown in the Figures) such as a magnetic or optical disk or the like. Channels for the transmission of data may likewise comprise storage media of all descriptions as well as signal-carrying media, such as wired or wireless signal-carrying media.

The present invention may further suitably be embodied as a computer program product for use with a computer system. Such an implementation may comprise a series of computer-readable instructions on fixed medium, such as a computer readable medium, for example, diskette, CD-ROM, ROM, or hard disk. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

Embodiments may be realized by a computer implemented method of deploying a service comprising steps of deploying computer program code operable to, when deployed into a computer infrastructure and executed thereon, cause said computer system to perform all the steps of the described method.

Further, it will also be clear to one skilled in the art that many improvements and modifications can be made to the foregoing exemplary embodiment without departing from the scope of the present invention.

The invention claimed is:

1. A method for modifying a user interface (UI) in a computing environment, the method comprising:
    listening for a first UI event;
    in a computing device, determining whether the first UI event is erroneous;
    in response to determining that the first UI event is erroneous, initiating a recording comprising a user fix of the error and a state associated with the UI of the first UI event;
    storing in a computing storage device the user fix as an alternative UI event; and
    in response to subsequently detecting the first UI event and a matching state associated with the UI of the first UI event, providing the alternative UI event such that the UI of the first UI event is modified.

2. The method of claim 1, further comprising:
    assigning a weight to at least one of: the first UI event and the alternative UI event.

3. The method of claim 1 wherein the modification of the UI of the first UI event further comprises:
    notifying the user of the alternative UI event.

4. The method of claim 1 wherein the modification of the UI of the first UI event further comprises:
    replacing the UI event with the alternative UI event.

5. The method of claim 1 wherein a weight associated with the first UI event is compared with a weight associated with the alternative UI event prior to replacing the UI event with the alternative UI event.

6. The method of claim 5 wherein the weight associated with the alternative UI is incremented subsequent to replacing the UI event with the alternative UI event.

7. The method of claim 5 further comprising:
    using the comparison in order to determine if the first UI event will be replaced with the alternative UI event.

8. An apparatus for modifying a user interface (UI), comprising:
    a listener for listening for a UI event;
    a determiner for determining whether the UI event is erroneous;
    a UI recorder, responsive to determining that the UI event is erroneous, for initiating a recording comprising a user fix of the error and a state associated with the UI of the UI event;
    means for storing the user fix as an alternative UI event; and
    means, responsive to subsequently detecting the UI event and a matching state associated with the UI of the UI event, for providing the alternative UI event such that the UI of the UI event is modified.

9. The apparatus of claim 8 wherein the means for assigning is configured to assign a weight to at least one of: the first UI event and the alternative UI event.

10. The apparatus of claim 9 wherein the means for assigning is further configured to notify the user of the alternative UI event.

11. The apparatus of claim 8 further comprising:
    a computer readable memory storing instructions and a processor, the instructions when executed by the processor causing the processor to replace the UI event with the alternative UI event.

12. The apparatus of claim 8 further comprising:
    a memory storing instructions and a processor, the instructions when executed by the processor causing the processor to: compare a weight associated with the first UI event with a weight associated with the alternative UI event prior to replacing the UI event with the alternative UI event.

13. The apparatus of claim 12 wherein the weight associated with the alternative UI is incremented subsequent to replacing the UI event with the alternative UI event.

14. The apparatus of claim 12 wherein the memory is further configured to use the comparison in order to determine if the first UI event will be replaced with the alternative UI event.

15. A computer code storage device, the computer code storage device storing instructions thereon, which when executed by a computing device cause the computer to perform steps comprising the following:
    listen for a first UI event;
    determine whether the first UI event is erroneous;
    in response to determining that the first UI event is erroneous, initiating a recording comprising a user fix of the error and a state associated with the UI of the first UI event;
    storing in a computing storage device the user fix as an alternative UI event; and
    in response to subsequently detecting the first UI event and a matching state associated with the UI of the first UI event, providing the alternative UI event such that the UI of the first UI event is modified.

16. The storage device of claim 15 wherein the instructions, which when executed further cause the computing device to assign a weight to at least one of: the first UI event and the alternative UI event.

17. The storage device of claim 15 wherein the instructions, which when executed further cause the computing device to notify the user of the alternative UI event.

18. The storage device of claim 15 wherein the instructions, which when executed further cause the computing device to replace the UI event with the alternative UI event.

19. The storage device of claim 16 wherein the instructions, which when executed further cause the computing device to compare a weight associated with the first UI event with a weight associated with the alternative UI event prior to replacing the UI event with the alternative UI event.

20. The storage device of claim 19 wherein the instructions, which when executed further cause the computing device to increment the weight associated with the alternative UI subsequent to replacing the UI event with the alternative UI event.

* * * * *